United States Patent
Song et al.

(10) Patent No.: US 7,227,438 B2
(45) Date of Patent: Jun. 5, 2007

(54) SUPERCONDUCTING WIRE TRANSPOSITION METHOD AND SUPERCONDUCTING TRANSFORMER USING THE SAME

(75) Inventors: Hee Suck Song, Changwon-si (KR); Woo Heng Heo, Changwon-si (KR); Jung Ho Park, Daegu (KR); Kyeong Dal Choi, Seoul (KR); Woo Seok Kim, Seoul (KR); Sung Hoon Kim, Seoul (KR)

(73) Assignee: Hyosung Corporation, Seoul (KR)

( * ) Notice: Subject to any disclaimer, the term of this patent is extended or adjusted under 35 U.S.C. 154(b) by 65 days.

(21) Appl. No.: 10/905,384

(22) Filed: Dec. 30, 2004

(65) Prior Publication Data

US 2007/0052506 A1 Mar. 8, 2007

(30) Foreign Application Priority Data

Sep. 24, 2004 (KR) ...................... 10-2004-0077188

(51) Int. Cl.
*H01F 6/00* (2006.01)
(52) U.S. Cl. ................................. 335/216; 336/DIG. 1
(58) Field of Classification Search ................ 505/211, 505/705, 879, 924, 880; 335/216; 336/DIG. 1
See application file for complete search history.

(56) References Cited

FOREIGN PATENT DOCUMENTS

| JP | 2000-021652 | | 1/2000 |
|----|-------------|---|--------|
| JP | 2000-030926 | | 1/2000 |
| JP | 2000277321 A | * | 10/2000 |
| KR | 96-005325 | | 4/1996 |
| KR | 0139602 | | 3/1998 |

* cited by examiner

Primary Examiner—Ramon M. Barrera
(74) Attorney, Agent, or Firm—John K. Park; Park Law Firm

(57) ABSTRACT

The present invention discloses a superconducting wire transposition method and superconducting transformer whose winding is formed of superconducting wire to enable the formation of transpositions. The superconducting wire transposition method characterized of different winding start positions of at least two disks wound with a plurality of parallel superconductive wires, and usage of different superconducting wires for conductors to be connected between the disks, thereby forming transpositions outside of the disks. Preferably, part of the plurality of disks are rotatably assembled in pairs so as to form transpositions while maintaining a total number of windings equally. Therefore, according to the present invention, transpositions can be formed without bending or welding superconducting wires and thus, deteriorations in superconductivity can be prevented.

4 Claims, 10 Drawing Sheets

SUPERCONDUCTING WIRE TRANSPOSITION METHOD AND SUPERCONDUCTING TRANSFORMER USING THE SAME

BACKGROUND OF THE INVENTION

1. Field of the Invention

The present invention relates in general to a superconducting wire transposition method, more specifically, to a superconducting wire transposition method and superconducting transformer whose winding is formed of superconducting wire to enable the formation of transpositions.

2. Description of the Related Art

In general, a transformer is a passive electrical device used to transfer an alternating current (or voltage) that is supplied to one winding to another winding by means of electromagnetic induction. The simplest type of transformer consists of at least two electric circuits and one common magnetic circuit for the electromagnetic induction. The electric circuits are formed with windings, and the magnetic circuit is formed of a steel core and arranged so that the magnetic circuit is in opposition to the electric circuit.

As shown in FIG. 1, the transformer includes a core 10, and a plurality of windings 12, 14, 16, such as, a primary winding 12, a secondary winding 14, and a tertiary winding 16.

And, as shown in FIG. 2, the transformer with the structure shown in FIG. 1 further includes an insulator 18 for facilitating the assembly process of the core 10 and the windings 12, 14, 16. After a winding 20 is formed on the insulator 18, the core 10 and the insulator 18 are assembled.

If it is necessary to use a plurality of conductors and a large current for the winding, a transposition A changing the positions of the parallel conductors takes place in order to make current-sharing of the parallel conductors equal.

In general, a traditional winding formed of copper wires requires many wire strands to minimize the winding loss caused by alternating current. Especially, the transformer consuming several hundreds to several thousands amperes of current employs several tens of wire strands. To make it work, a variety of winding methods, helical winding, cylindrical winding, and successive winding for example, have been tried. These methods have been developed to attain the same purposes, such as, minimizing coil size, and reducing insulation and winding loss.

The following will now explain the transposition for minimizing the winding loss.

In the case of using more than two strands of parallel conductors for the winding, a voltage drop occurs between each wire due to the difference of internal resistance of the wire inside of the winding and external resistance of the wire outside of the winding. In addition, an induced voltage difference occurs between the internal wire and the external wire of the winding because of the difference in the number of opposite flux. As a result thereof, a circulating current flows between the parallel conductors, and this in turn increases in the winding loss.

Therefore, the transposition method is developed to minimize the circulating current. What it does is to exchange the positions of the inner wire 20a and the external wire 20b at a proper place so that the number of opposite flux between the internal and external wires can be equal. Preferably, transpositions occur at least one less than the number of wire strands. For instance, if four strands of parallel conductors are used, transpositions should occur at least three times.

In recent years, a number of studies have been paid to the development of a transformer based on superconductivity. Unfortunately however, the superconducting transformer imposes several problems with the occurrence of the above-described transposition.

More specifically speaking, superconductivity is a phenomenon occurring in certain materials when temperatures, magnetic fields, and current are lower than the critical levels thereof, and is characterized by the complete absence of electrical resistance. To apply a superconductor to the winding of electric power equipment including the superconducting transformer, it is important to keep the critical current level to maintain superconductivity.

Especially, in case of manufacturing a winding with a plurality of parallel-connected superconductors to generate a large current flow therein, current-sharing between parallel conductors should be uniform. If this is not observed, that is, if the current-sharing between parallel conductors is not uniform, a particular conductor out of the superconducting parallel conductors may cause current distribution and thus, the critical current value is exceeded. When this occurs, superconductivity is lost, and severe damages can be done on the superconducting winding.

Accordingly, to prevent the current distribution, it is necessary to have transpositions as seen in the copper coil winding.

However, a different approach has to be made to apply the transposition method to superconductors because superconductors are made out of ceramic materials and easily lose their superconductivity when they are bent or twisted under pressure. Thus, the traditional transposition method used in the copper winding is not equally effective for the superconductors.

There is a need, therefore, to suggest a new superconducting wire transposition method that works best for the superconducting transformer.

SUMMARY OF THE INVENTION

It is, therefore, an object of the present invention to provide a superconducting transformer, for which transposition is made possible without losing superconductivity of superconductors used as the transformer wires.

To achieve the above object, there is provided a superconducting wire transposition method characterized of different winding start positions of at least two disks wound with a plurality of parallel superconductive wires, and usage of different superconducting wires for conductors to be connected between the disks, thereby forming transpositions outside of the disks.

Preferably, the winding start points between the disks are changed by an angle that is obtained dividing 360° by the number of windings.

Preferably, part of the plurality of disks are rotatably assembled in pairs so as to form transpositions while maintaining a total number of windings equally.

Also, the superconducting wire transposition method of the present invention can be applied to other superconducting devices including superconducting electric motors, superconducting magnetic energy storage, and superconducting fault current limiters.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A preferred embodiment of the present invention will be described herein below with reference to the accompanying drawings.

Transposition in parallel conductors will be first described with reference to FIG. 3.

Figure 1:
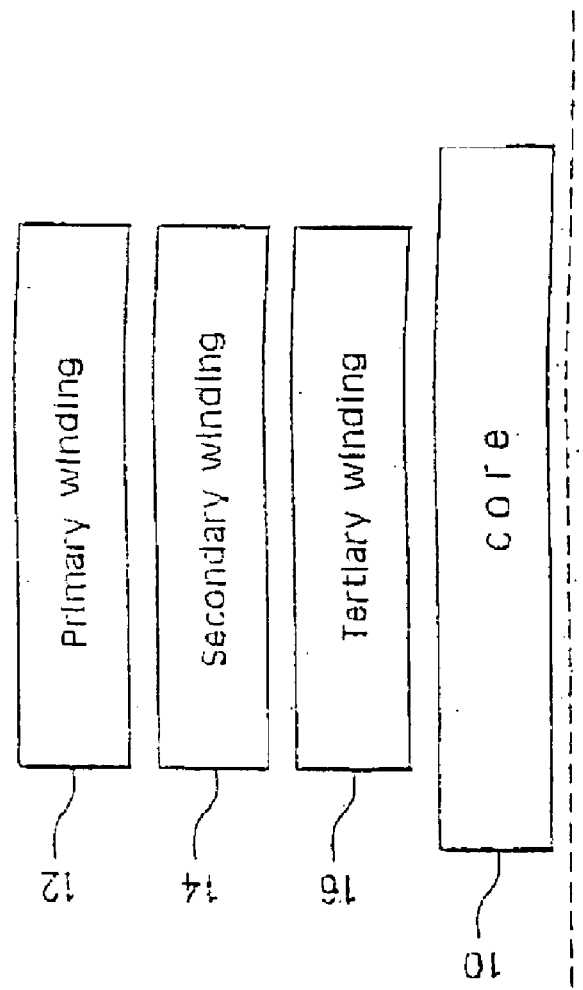
FIG. 1 is a diagram illustrating a winding structure of a related art transformer.
Figure 2:
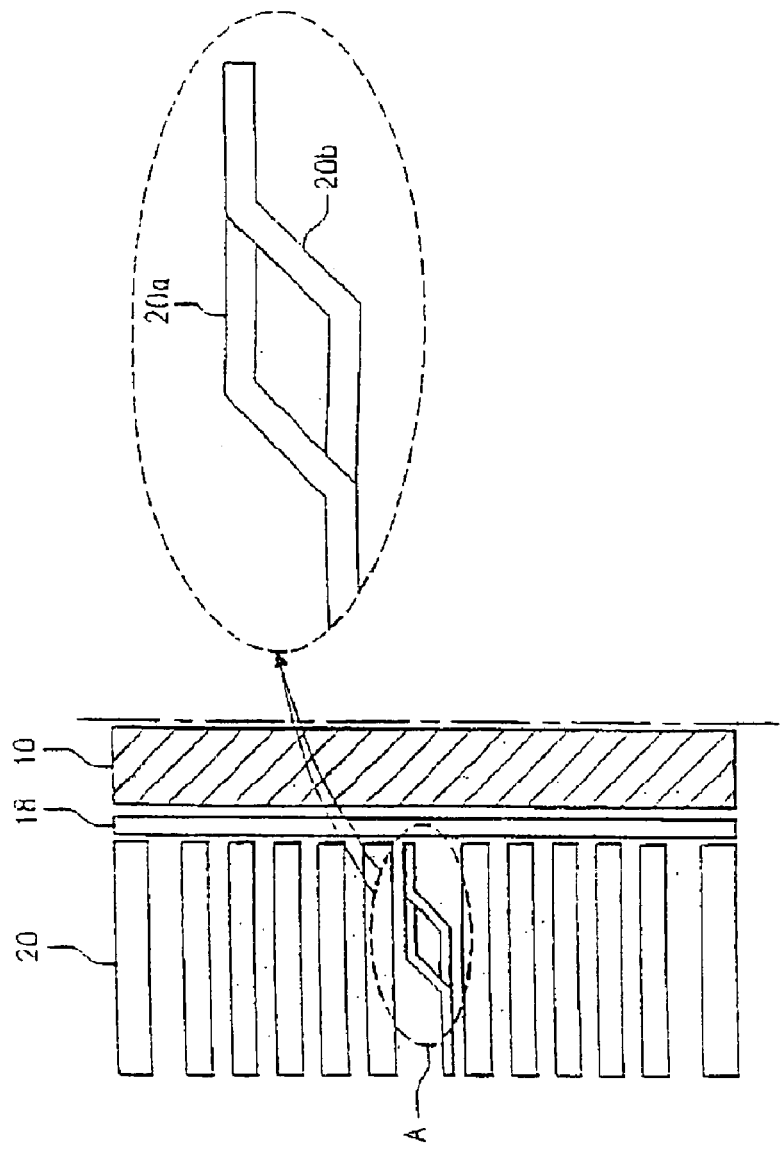
FIG. 2 is a diagram describing transposition in a related art transformer.
Figure 3:
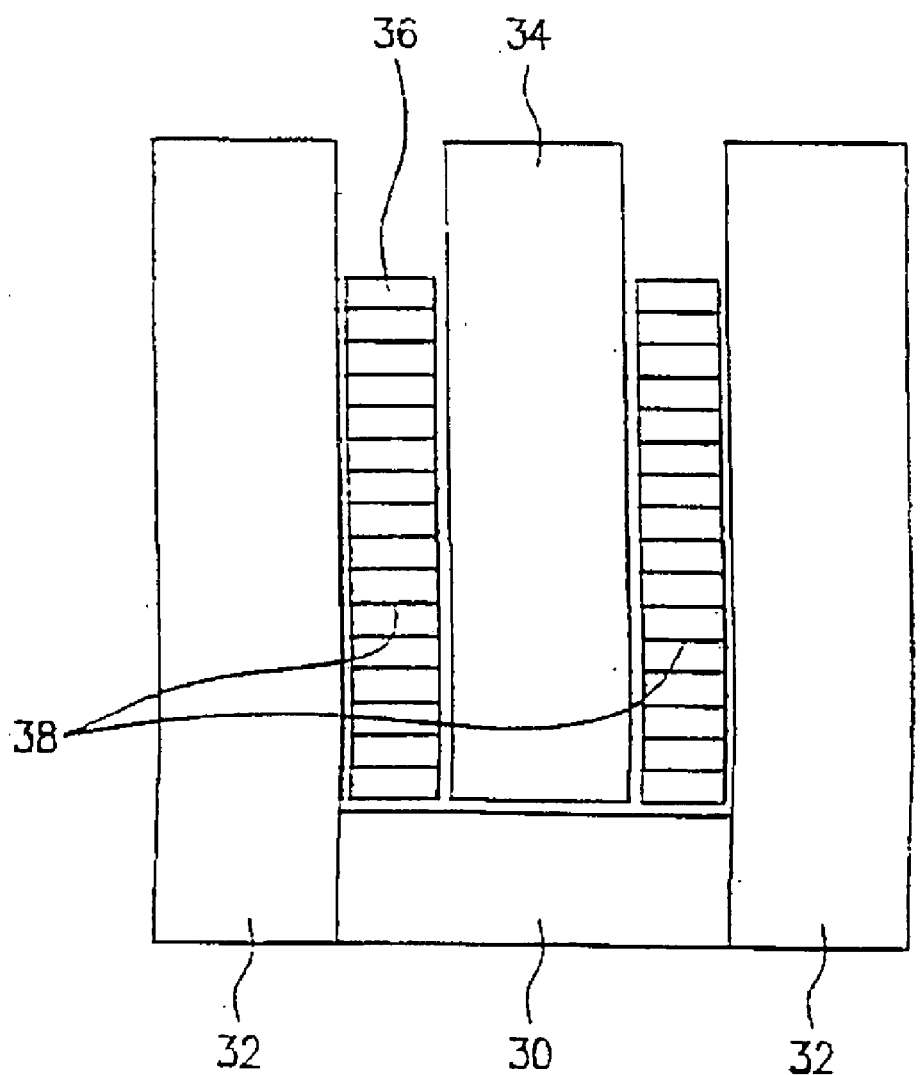
FIG. 3 is an exemplary diagram of a successive winding structure for describing a superconducting wire transposition method according to the present invention.

Referring to a bobbin structure shown in FIG. 3, wings 32 are formed on both sides centering around a base 30, and a spacer 34 is disposed at the central upper portion of the base 30. And, disks 36 are formed in areas between the wings 32 and the spacer 34, respectively. The disk 36 is formed of superconducting wires 38.

Each disk 36 in FIG. 3 has a successive winding structure, and the two disks are modularized to one, forming a double disk 36 together. As described above, the bobbin structure features supporting the double disk 36.

For instance, if the total number of turns of 4 superconducting wire strands connected in parallel is "80", transpositions should occur at least three times, and four double disks should be formed. In other words, the number of turns for each double disk becomes "20".

Since the double disk consists of two disks, each disk is allocated with "9" turns out of "20" turns, and the remaining "2" turns are used to connect those two disks to each other.

That is, the 4-strand parallel conductors in the double disk have different numbers of turns from each other.

Figure 4:
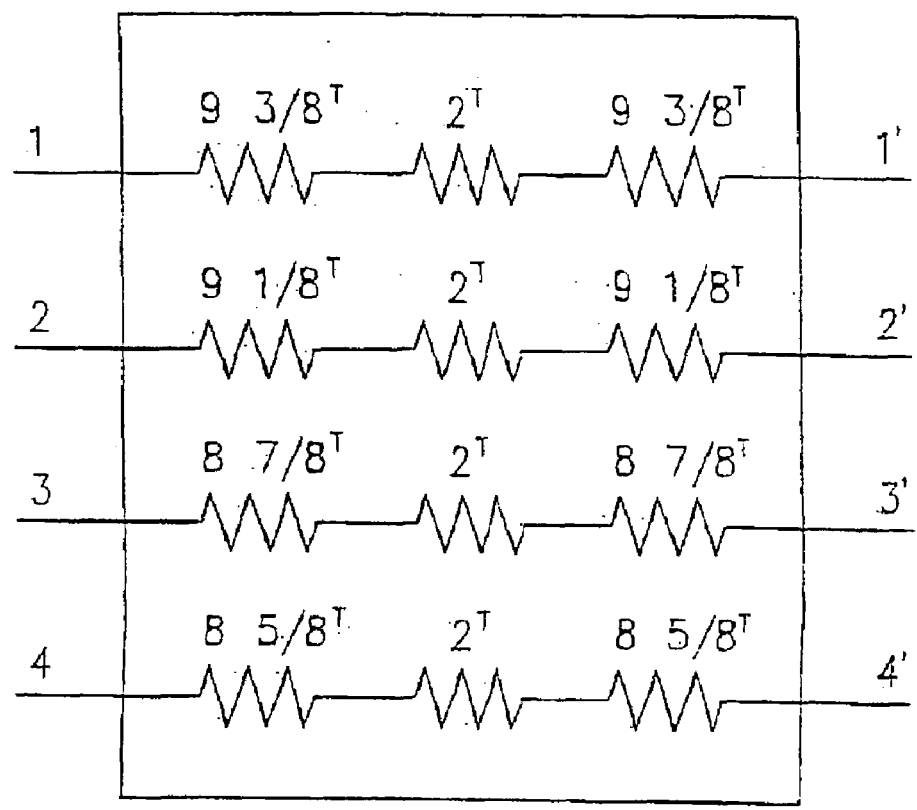
FIG. 4 is an exemplary circuit diagram showing a state of turns wound on a double disk according to the present invention.

As shown in FIGS. 3 and 4, the transposition according to the present invention occurs outside the windings, and to make it possible, the winding start point of each parallel conductor should be different from each other. Moreover, since the winding of the double disk is successive without any connection between two disks, each disk in the double disk is wounded in opposite directions.

Figure 5A:
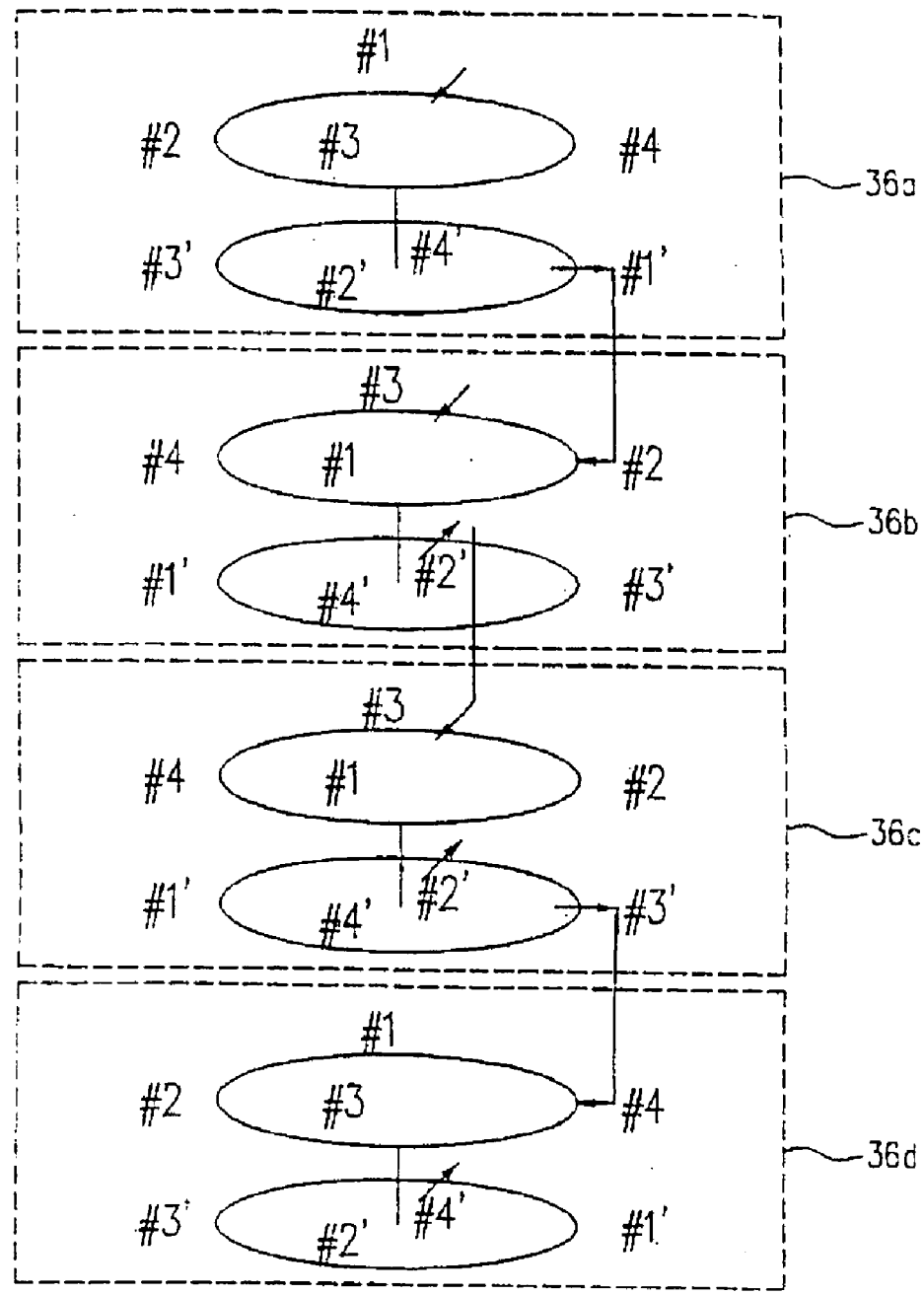
FIG. 5a to FIG. 5d respectively illustrate how superconducting wires are connected to each other.
Figure 5B:
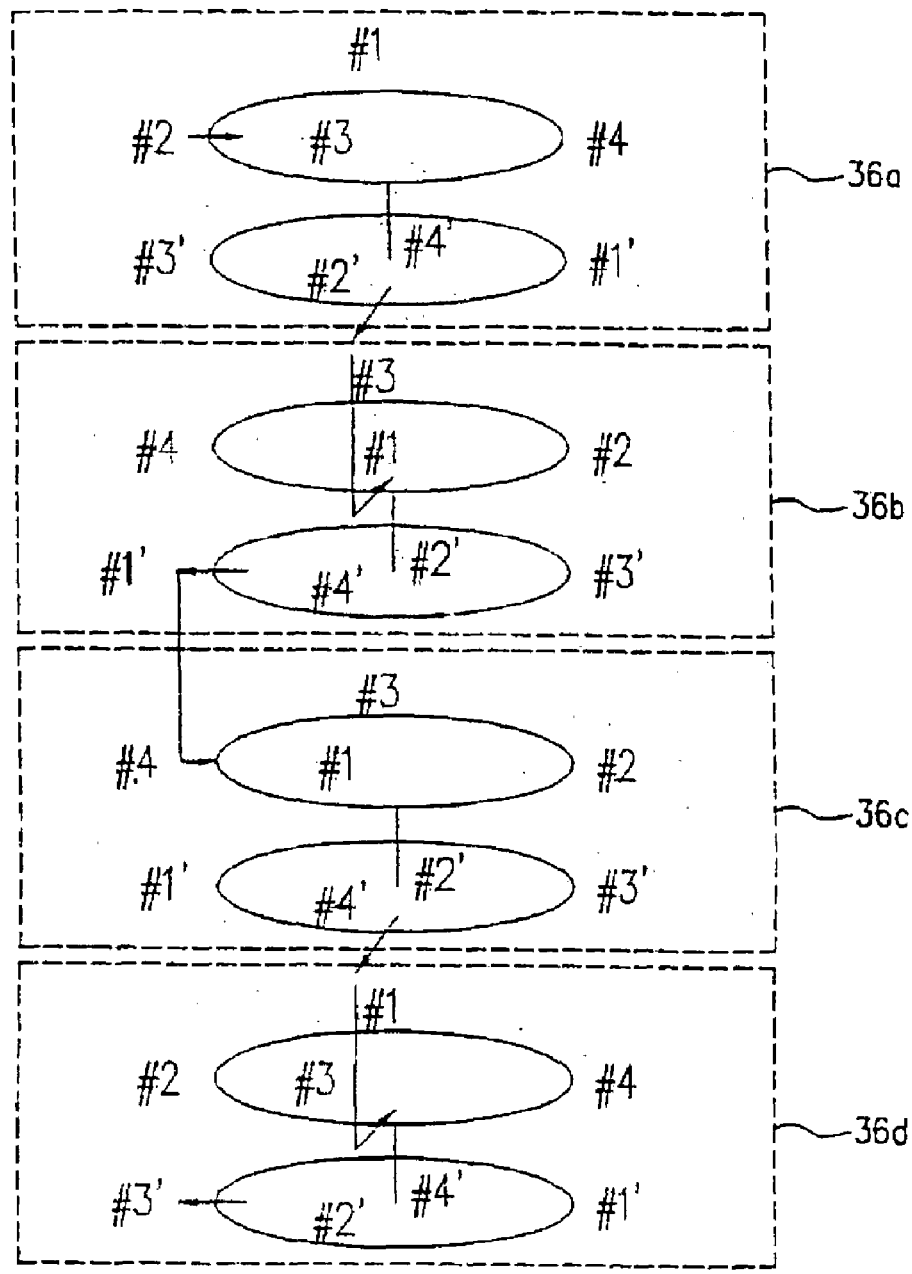
Figure 5C:
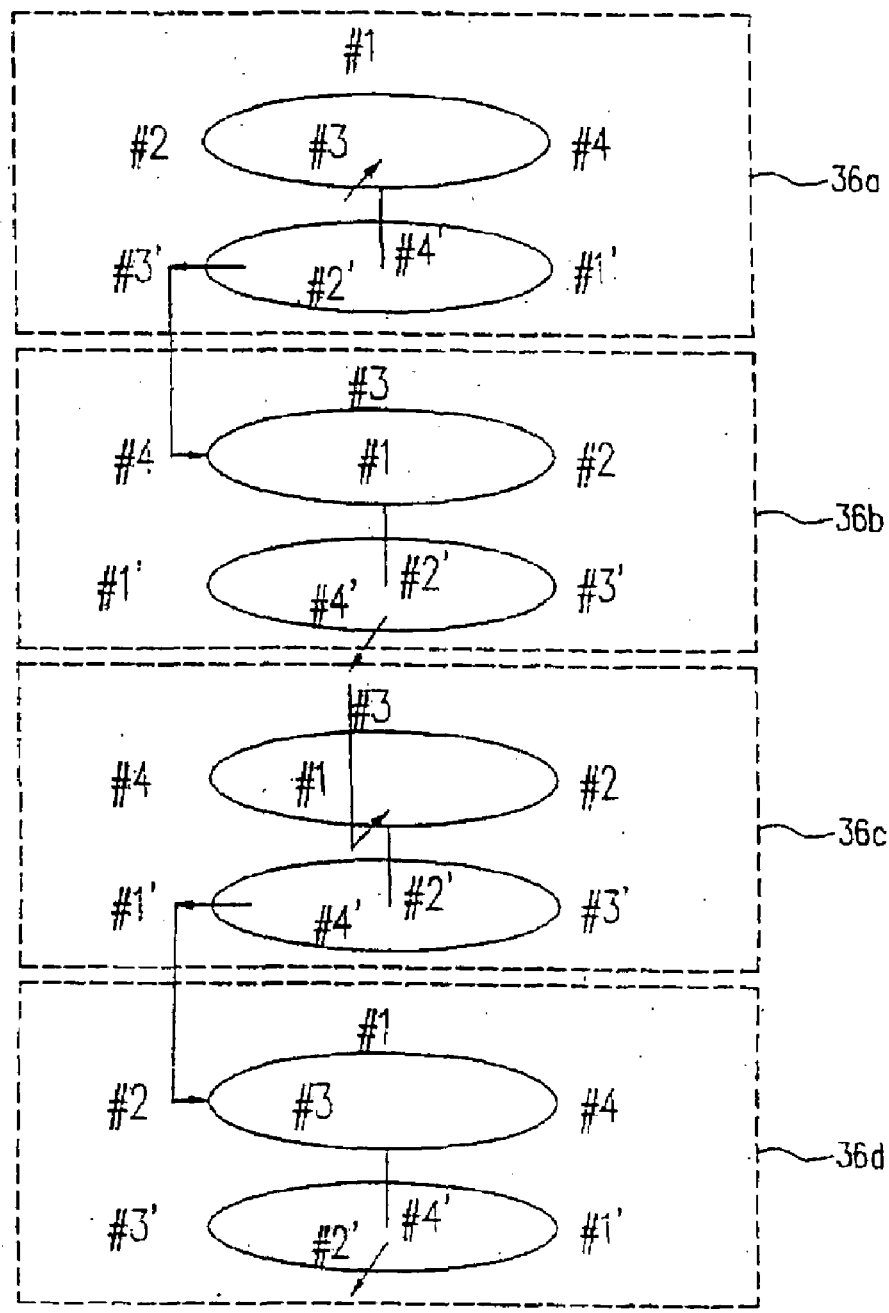
Figure 5D:
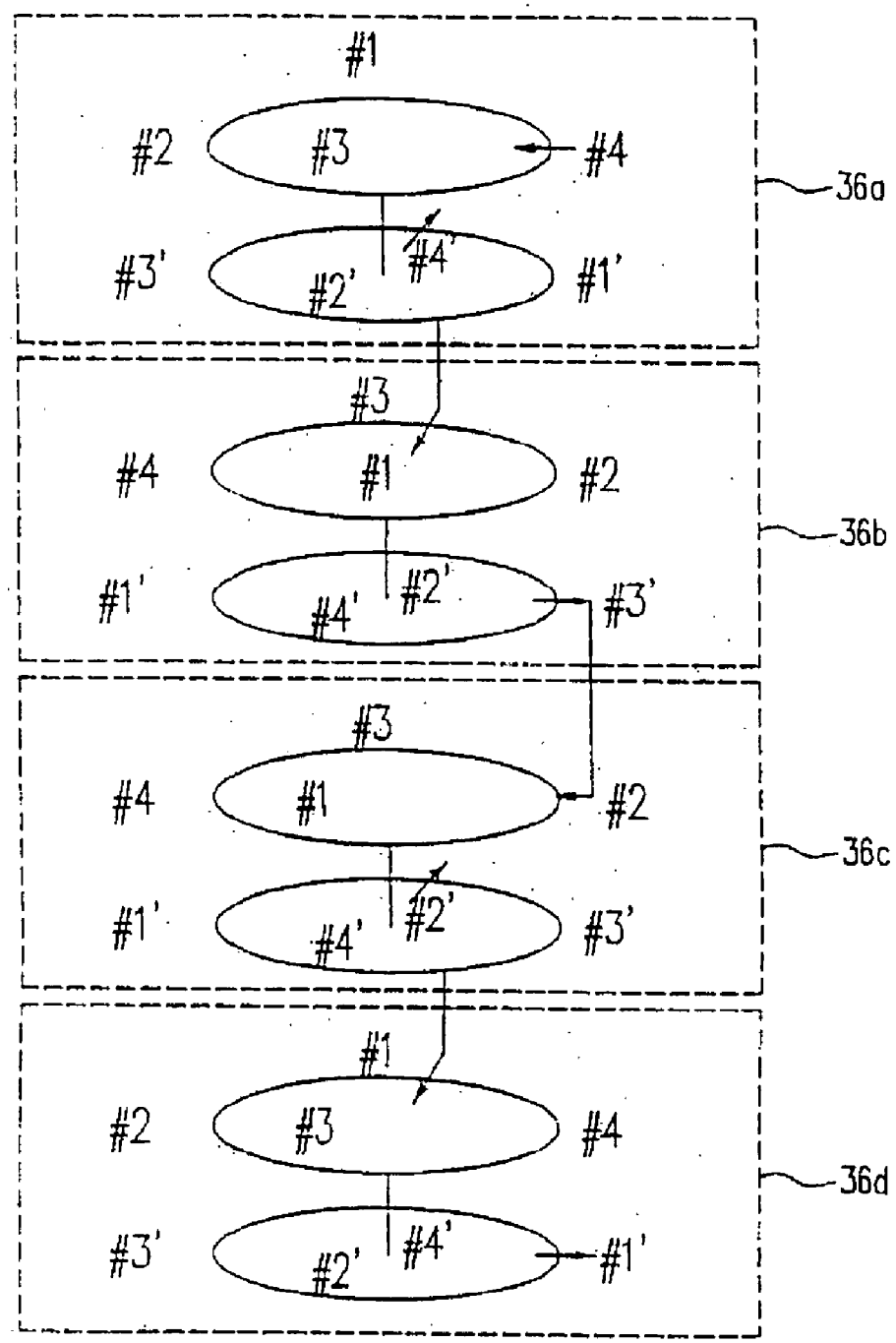

That is, as shown in FIG. 5a, the start point of each parallel conductor changes per quarter of 360°, i.e., per 90°. Likewise, when there are three more windings in the double disk as illustrated in FIGS. 5b–5d, a total of 4 windings 36a, 36b, 36c, and 36d are formed on the double disk, and a total number of turns required is "80".

Particularly, the above-described double disk should be assembled for transposition and thus, three times of transpositions take place on the double disk, or between double pancake.

In other words, instead of connecting the parallel conductors to the same conductors, the number of turns allocated for each parallel conductor is set equally. Therefore, as shown in FIG. 5a, connection of the conductors is like #1, #1', #2, #2', #3, #3', #4, #4'. This is based on the fact that the numbers of turns for those four parallel conductors in the double disk are different from each other, as illustrated in FIG. 4.

Figure 6:
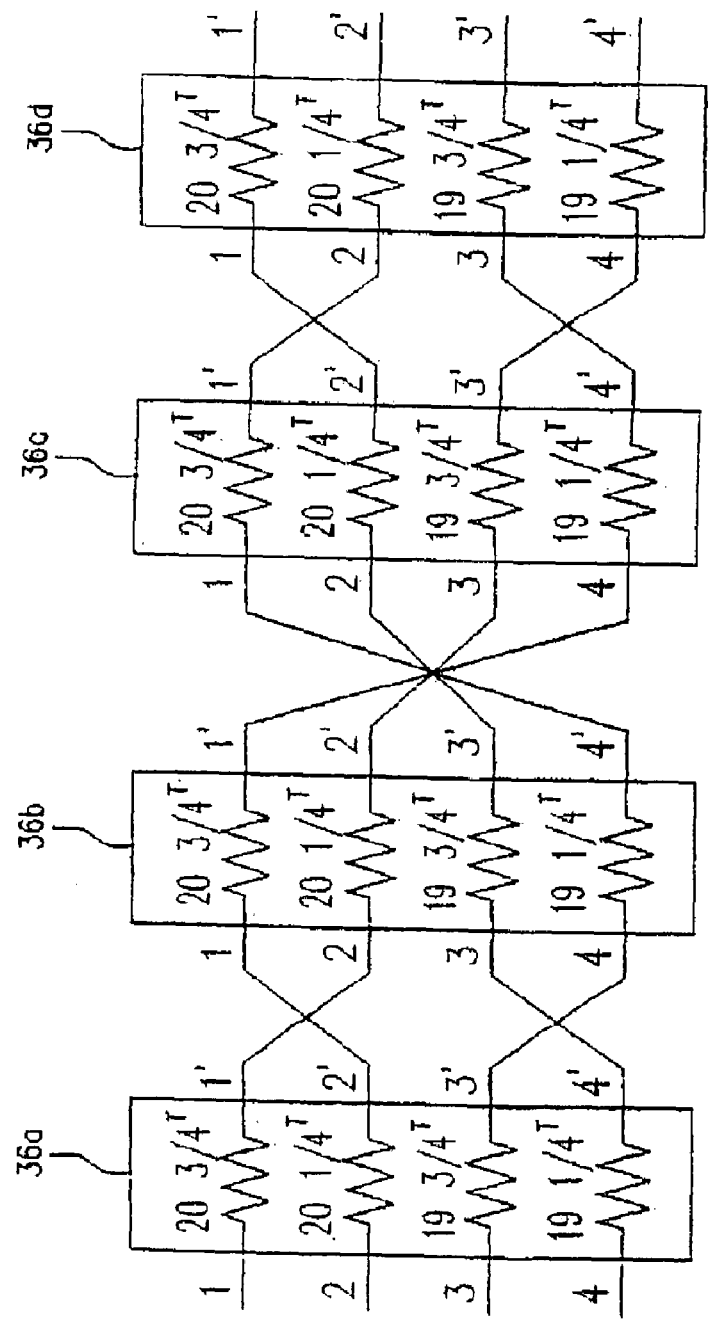
FIG. 6 diagrammatically illustrates a transposition state according to the present invention.
Figure 7:
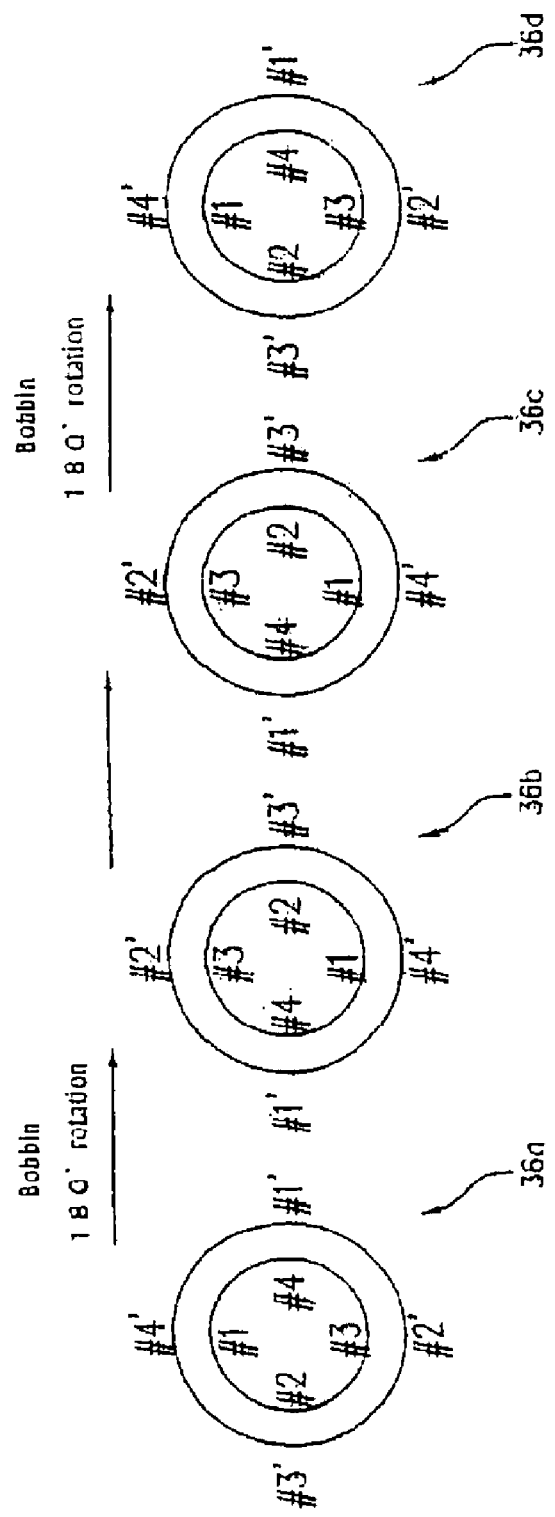
FIG. 7 diagrammatically illustrates a double disk assembly method according to the present invention.

FIG. 6 illustrates the number of turns and transposition state of each double disk for transpositions of 4-parallel conductors therein. As shown in the drawing, the transposition occurs three times between double disks 36a, 36b, 36c, 36d.

To adjust the number of turns of the conductors within a given total number of turns, the bobbin needs to be rotatably assembled. For example, when assembling the double disks 36a, 36b, the bobbin is rotated by 180°. Similarly, when assembling the other double disks 36c, 36d, the bobbin is again rotated by 180°.

In conclusion, it is one advantage of the transposition method according to the present invention that transposition takes place without hurting superconductivity, and the superconducting wires for use in the transformer do not need to be bent or welded either.

Also, by connecting 4 strands of superconducting wires in parallel as in the present invention, it becomes possible to prevent the generation of circulating current.

Moreover, a plurality of double disks are assembled to form a full winding connection, and the transposition of each parallel conductor occurs at a desired position and number of turns obtained by rotating each double disk.

Therefore, properly distributed start points of double disks can be effectively applied to a high-capacity current, and manufacture of high-voltage windings.

Lastly, the superconducting wire transposition method of the present invention can be applied to other superconducting devices including superconducting electric motors, superconducting magnetic energy storage, and superconducting fault current limiters.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A superconducting wire transposition method characterized of different winding start positions of at least two disks wound with a plurality of parallel superconductive wires, and usage of different superconducting wires for conductors to be connected between the disks, thereby forming transpositions outside of the disks.

2. The method according to claim 1, wherein the winding start points between the disks are changed by an angle that is obtained dividing 360° by the number of windings.

3. The method according to claim 1, wherein part of the plurality of disks are rotatably assembled in pairs so as to form transpositions while maintaining a total number of windings equally.

4. The method according to claim 3, wherein the pair of rotatably assembled disks are rotated by 180°.

* * * * *